United States Patent
Kant et al.

(10) Patent No.: US 6,836,466 B1
(45) Date of Patent: Dec. 28, 2004

(54) METHOD AND SYSTEM FOR MEASURING IP PERFORMANCE METRICS

(75) Inventors: Krishna Kant, Eatontown, NJ (US); Richard C. Lau, Morganville, NJ (US); Bruce Siegell, Shrewsbury, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 09/579,371

(22) Filed: May 26, 2000

(51) Int. Cl.[7] .............................................. G06F 11/00
(52) U.S. Cl. ...................... 370/252; 370/232; 370/235; 370/241.1; 370/248; 375/225
(58) Field of Search ................................. 370/232, 233, 370/234, 235, 236, 236.1, 236.2, 238, 241, 241.1, 248, 249, 252, 253, 254; 375/224, 225

(56) References Cited

U.S. PATENT DOCUMENTS

| | | | | |
|---|---|---|---|---|
| 5,375,199 A | * | 12/1994 | Harrow et al. | 395/159 |
| 5,451,839 A | * | 9/1995 | Rappaport et al. | 375/224 |
| 6,058,102 A | * | 5/2000 | Drysdale et al. | 370/252 |
| 6,363,056 B1 | * | 3/2002 | Beigi et al. | 370/252 |
| 6,487,604 B1 | * | 11/2002 | Rochford et al. | 709/238 |
| 6,614,763 B1 | * | 9/2003 | Kikuchi et al. | 370/252 |

* cited by examiner

Primary Examiner—Dang Ton
Assistant Examiner—Shick Hom
(74) Attorney, Agent, or Firm—Joseph Giordano

(57) ABSTRACT

A method and system is provided for measuring network performance. The method and system divides a stream of packets flowing through a first point into frames, the first point being any point in the network that supports a packet flow, creates packages corresponding to the frames, correlates each package with packets flowing through a second point, the second point being any point in the network that supports the packet flow, and calculates network performance information based on the correlated packages.

25 Claims, 13 Drawing Sheets

Package Data Structure

| | | | | | | |
|---|---|---|---|---|---|---|
| 1003 ⏷ | Flow identifier (a numeric value used to index the identifying information for a flow) | | | | | |
| 1004 ⏷ | Frame number (for frame preceding the current package) | | | | | |
| 1005 ⏷ | Package size (number of packet headers in current package) = PS | | | | | |
| 1006 ⏷ | Src. addr/port 1 | Dest. addr/port 1 | IP identifier 1 | Frag. flag/offset 1 | Time stamp 1 | Locally-generated sequence number 1 | Running duplicate count 1 |
| 1007 ⏷ | Src. addr/port 2 | Dest. addr/port 2 | IP identifier 2 | Frag. flag/offset 2 | Time stamp 2 | Locally-generated sequence number 2 | Running duplicate count 2 |
| 1008 ⏷ | Src. addr/port 3 | Dest. addr/port 3 | IP identifier 3 | Frag. flag/offset 3 | Time stamp 3 | Locally-generated sequence number 3 | Running duplicate count 3 |
| | ... | ... | ... | ... | ... | ... | ... |
| 1009 ⏷ | Src. addr/port PS | Dest. addr/port PS | IP identifier PS | Frag. flag/offset PS | Time stamp PS | Locally-generated sequence number PS | Running duplicate count PS |

FIG. 10

Header-Storage Data Structure 1200

| | | | | | | |
|---|---|---|---|---|---|---|
| 1202 | Flow identifier (a numeric value used to index the identifying information for a flow) | | | | | |
| 1203 | Last frame number (frame number for most recently received package) | | | | | |
| 1204 | Sequence number of packet at beginning of current frame = FB | | | | | |
| 1205 | Current packet index (following most recent packet) = FC | | | | | |
| 1206 | Number of duplicate packets since start of previous package | | | | | |
| 1207 | Src. addr/port FB | Dest. addr/port FB | IP identifier FB | Frag. flag/offset FB | Time stamp FB | Locally-generated sequence number FB | Running duplicate count FB |
| 1208 | Src. addr/port FB+1 | Dest. addr/port FB+1 | IP identifier FB+1 | Frag. flag/offset FB+1 | Time stamp FB+1 | Locally-generated sequence number FB+1 | Running duplicate count FB+1 |
| 1209 | Src. addr/port FB+2 | Dest. addr/port FB+2 | IP identifier FB+2 | Frag. flag/offset FB+2 | Time stamp FB+2 | Locally-generated sequence number FB+2 | Running duplicate count FB+2 |
| 1210 | ... | ... | ... | ... | ... | ... | ... |
| 1211 | Src. addr/port FC-1 | Dest. addr/port FC-1 | IP identifier FC-1 | Frag. flag/offset FC-1 | Time stamp FC-1 | Locally-generated sequence number FC-1 | Running duplicate count FC-1 |

FIG. 12

METHOD AND SYSTEM FOR MEASURING IP PERFORMANCE METRICS

BACKGROUND OF THE INVENTION

The present invention relates generally to computer networks. More particularly, this invention relates to the measurement of network performance.

Communications systems, such as packet networks, are used in various applications for transporting data from one user site to another. At a transmission site in a packet network, data is typically partitioned into one or more packets each of which includes a header containing routing and other information relating to the data. The network then transports the packets to a destination site in accordance with any of several conventional protocols known in the art, such as Asynchronous Transfer Mode (ATM), Frame Relay (FR), High Level Data Link Control (HDLC), X.25, etc. At the destination site, the data is restored from the packets received from the transmission site.

The nature of packet switched technology, however, complicates the ability of an Information Technology (IT) manager of an end-user network to monitor the performance of a wide area network (WAN) service provider. The WAN service provider administers a WAN used for transporting data packets originating from customer premises equipment (CPE) in the end-user network across the WAN. Both the customer and the network service provider have an interest in monitoring the performance of the WAN in order to corroborate that the performance comforms with the quality of service "guaranteed" by the WAN service provider.

For example, one type of end-user network is an Internet Protocol (IP) Virtual Private Network (VPN). A VPN includes a set of Virtual Private Links (VPLs), each of which is a communication channel between two customer networks.

Network performance guarantees have emerged as a means for IT managers to ensure that their critical businesses data is delivered in a reliable, consistent manner. The term Service Level Agreements (SLA) refers to these performance guarantees. Common SLA parameters (or metrics) include packet throughput, packet loss ratio (PLR), packet delay, packet jitter, and service availability.

A Measurement Point is the boundary between a host and an adjacent link at which performance reference events can be observed and measured. A source Measurement Point and a destination Measurement Point are two Measurement Points at which packet traffic is measured. The traffic measured flows between the source and destination Measurement Points, but may originate before the source Measurement Point and may terminate after the destination Measurement Point.

The difference between the packet counts at a source Measurement Point and a destination Measurement Point divided by the packet count at the source Measurement Point for a measured interval of time defines the PLR. The service availability parameter, defined as the percentage of time that the IP service is available, depends on the PLR. One basis for the service availability function is a threshold on the PLR performance. The IP service is available on an end-to-end basis if the PLR for that end-to-end case is smaller than the threshold defined by the customer.

Packet delay is defined as the amount of time it takes for a packet to travel from the source Measurement Point to the destination Measurement Point. The differences between delays for a pair of consecutive packets that are observed at source and destination Measurement Points constitutes a packet jitter metric.

The primary objective of any service provider is to provide a quality service to its customers. Achieving a desired level of quality is not an easy task in light of the complexity of existing network environments. A network environment includes different types of equipment with different types of statistics for measuring performance, making difficult the measurement and correlation of end-to-end statistics.

Existing SLA monitoring devices monitor and collect statistics with respect to a specific technology (e.g., FR) or layer. Such devices, however, do not offer the capability of correlating IP statistics measured at two different points of an IP network that are separated by multiple lower layer networks. Knowing the SLA metrics with respect to a FR network (i.e., a WAN) is not sufficient for reporting end-to-end SLA metrics for a VPN that connects two CPE's.

FIG. 1 illustrates a network 100, which incorporates one such SLA monitoring device. The network 100 includes two CPE's 102 and 104, two Passive Monitors (PMs) 112 and 114, two FR networks 106 and 108, an IP/ATM network 110, two routers 1000 and 1002 and a Data Analyzer (DA) 116. As shown in FIG. 1, the network 100 includes clusters of technology domains (e.g., ATM, FR), which make up the paths for the VPN. The network 100 of FIG. 1 only shows two nodes of the VPN, namely CPE1 102 and CPE2 104. Each CPE 102 and 104 has an associated, distinct set of IP addresses.

A VPL is established between CPE1 102 and CPE2 104, which are considered end-points of the VPN. Consequently, end-to-end network performance statistics refer to the measurement of the PLR, delay, etc., associated with packets transported from one CPE to another. Although the VPL uses a particular protocol, such as EP, for supporting communication between the two CPEs, the IP packets constituting the VPL can be transported from a CPE to another CPE via intermediate networks that use various lower layer protocols. FR networks 106 and 108 and IP/ATM network 110 exemplify such intermediary networks in the network 100 of FIG. 1. The IP/ATM 110 network refers to either an IP network or an ATM backbone network. Routers 1000 and 1002 are used to connect the IP/ATM network 110 with the FR networks 106 and 108 respectively. The IP/ATM 10 network may include IP routers (not shown).

The PMs 112 and 114 are devices that tap into the network at two different Measurement Points, $MP_A$ and $MP_B$, to capture FR signals. These PMs are referred to as passive monitoring devices because they collect and store the captured data without changing the packet flow.

The DA 116 is a management console that runs on a PC platform and performs analysis of the data collected by the PMs 112 and 114. The DA 116 produces reports that include SLA metrics associated with the FR network 106. The DA 116 bases the reports on the analysis of the collected data.

The PMs 112 and 114 tap into the FR network 106 through T1 monitoring jacks. The DA 116 is connected to each of the PMs 112 and 114 via an Ethernet network. Once the PMs 112 and 114 capture and store the FR signals, the PMs 112 and 114 send the collected information to the DA 116.

As mentioned above, the DA 116 produces SLA reports for FR traffic statistics, as opposed to IP level traffic statistics. That is, frames are used as the basis for performance measurement, not IP packets. Although not shown, the FR network 106 is also capable of carrying non-IP traffic in the frames. Knowing the SLA metrics with respect to a FR network (e.g., FR network 106), however, is not sufficient for reporting end-to-end SLA metrics for an IP VPN that connects two CPE locations that are on different access networks. PM 114 cannot be relocated to FR network 108 (i.e., between the FR network 108 and the CPE2 104) to measure end-to-end statistics based on Frame Relay information because the Frame Relay network is not end-to-end. The frames transported on the FR network 108 are not the same (i.e., they have different headers) as those transported on FR network 106.

Although there are PMs available in the market for monitoring IP traffic (rather than just frames or ATM cells) and for enabling the DA 116 to produce SLA reports for IP level traffic statistics relevant to the performance of the VPL established between CPE1 102 and CPE2 104, there still would not be any correlation of IP information at different points of the VPN. The correlation of network statistics is desirable because it allows for scalability in the network 100. That is, correlation of statistics opens the possibility to place any number of PMs at any point in the network in order to obtain end-to-end SLA metrics for a VPN that connects more than two CPE locations. Therefore, there is a need in the art for a performance measurement system that allows the measurement of end-to-end SLA metrics by correlating SLA statistics collected at any two points in a network, which may include a plurality of sub-networks.

SUMMARY OF THE INVENTION

Accordingly, it is an object of the present invention to meet the foregoing needs by providing systems and methods for measuring network performance.

Methods and systems consistent with the present invention measure network performance by dividing a stream of packets flowing through a first point into logical frames, where the first point is any point in the network that supports a packet flow. Such methods and systems capture information about the packets in "packages" corresponding to the frames and correlate the contents of each package with packets flowing through a second point, where the second point is any point in the network that supports the packet flow. Network performance information is then calculated based on the correlated packages.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

FIG. 10 illustrates the data structure of a package, in accordance with methods and systems consistent with the present invention;

FIG. 12 illustrates the data structure of a header storage in a destination device, in accordance with methods and systems consistent with the present invention.

DETAILED DESCRIPTION

Figure 1:
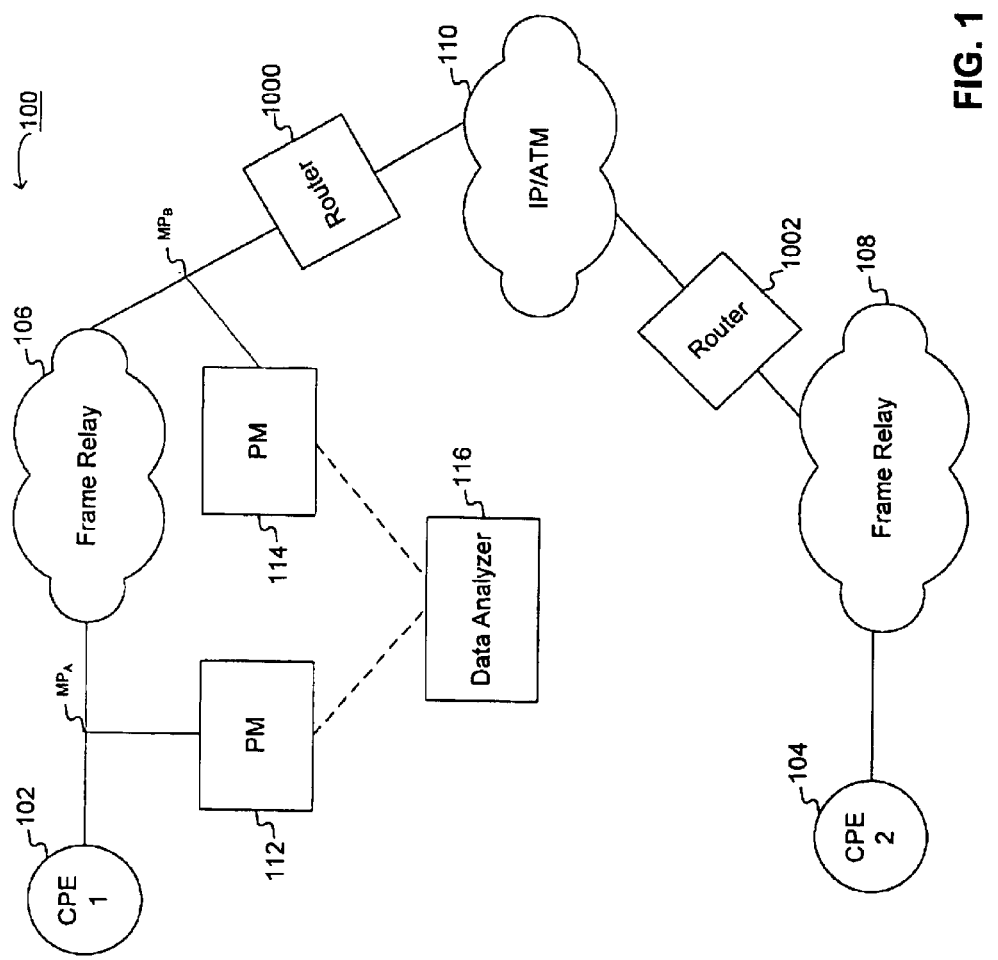
FIG. 1 illustrates a prior art system for measuring the performance of a service provider.

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention measure network performance by monitoring any two points supporting a packet flow in a network. For purposes of the following description, the systems and methods consistent with the present invention are described with respect to an IP packet flow corresponding to a Virtual Private Network. However, the description should be understood to apply in general to any IP packet flow carrying packets that are uniquely identifiable.

In order to measure the performance of a VPN in accordance with the present invention, the packets corresponding to the VPN must be uniquely identifiable. These packets are first monitored at a first point in a network supporting the VPN. Each of the packets includes information that uniquely identifies the packet. This packet information is stored in the memory of a source device for each monitored packet.

The source device selects information related to certain packets and places the selected information in a package. In addition to the packet information, the package includes information regarding the VPN associated with each of the packets in the package. The package is then transmitted to a destination device via an overhead channel. For this discussion source and destination devices are logical entities. A physical measuring device could act as multiple logical devices, sources or destinations (for multiple VPLs).

In addition to receiving packages from the source device, the destination device monitors and stores packets corresponding to the VPN. To accomplish this, the destination device is connected to any other point in the network that supports the VPN whose performance is to be measured. The destination device correlates the packets monitored at this other point in the network with the packages received from the source device. Finally, the destination device calculates network performance statistics based on the results from the correlation.

Figure 2:
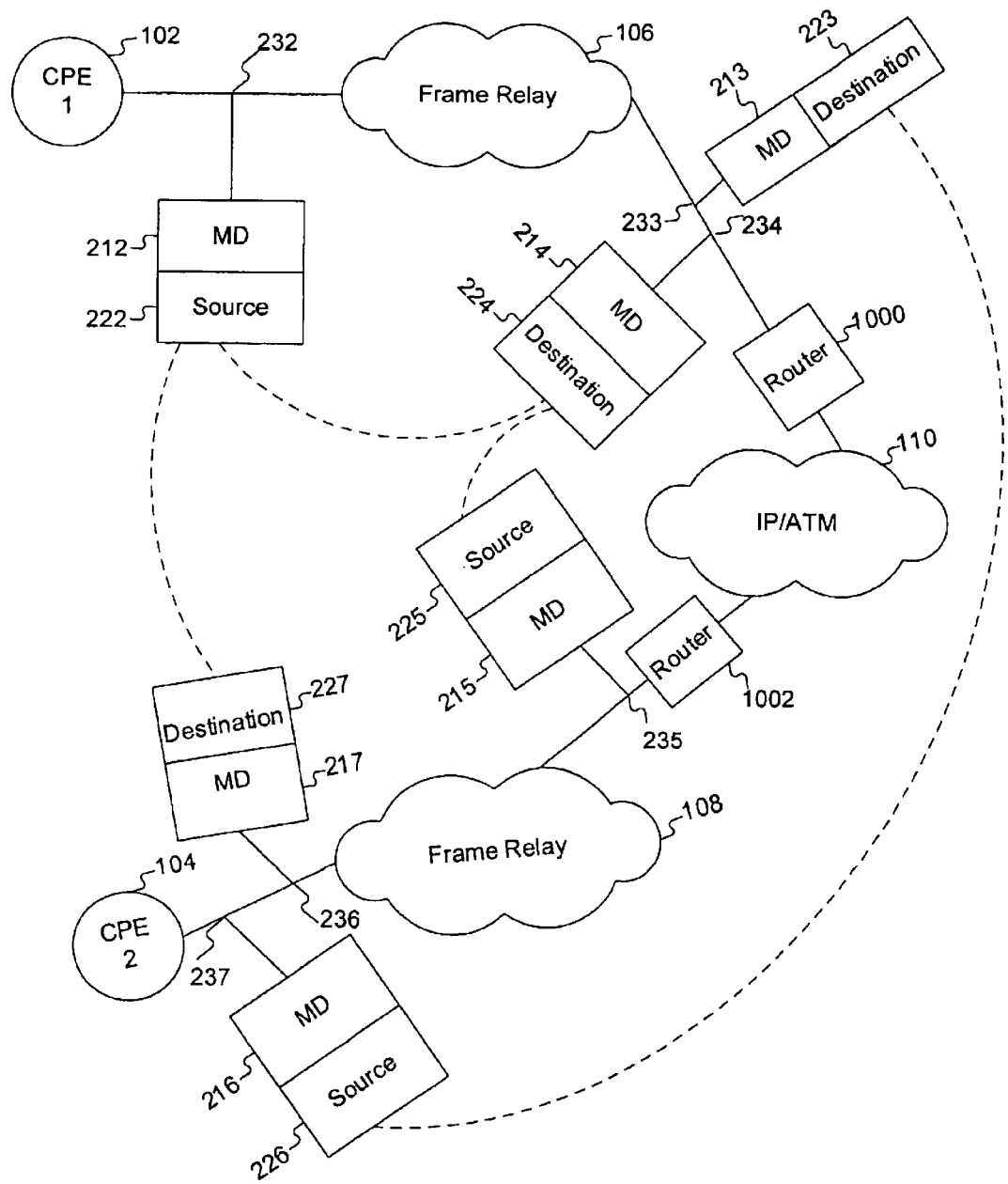
FIG. 2 illustrates one embodiment of the present invention for measuring network performance in a Virtual Private Network, in accordance with methods and systems consistent with the present invention.

FIG. 2 shows in a network 200, which supports a VPN (not shown), a number of points where a monitoring device (MD) may be placed, in accordance with an embodiment of the invention. The network 200 includes CPEs 102 and 104, FR networks 106 and 108, an IP/ATM network 110, routers 1000 and 1002, MDs 212–217, source devices 222, 225 and 226, and destination devices 223, 224 and 227.

The source devices 222, 225 and 226 are electronic devices (e.g., a processor with a memory implementing an algorithm) that divide a stream of IP packets into logical frames, create packages corresponding to the logical frames, and send the packages to the destination devices 223, 224, and 227 as shown by the dotted lines in FIG. 2.

The destination devices 223, 224 and 227 are electronic devices that correlate packages containing packet information associated with packets monitored at first points 236, 235, and 232, with packets monitored at second points 233, 234, and 237. Further, the destination devices 223, 224, and 227 use the results of a given correlation to calculate network performance parameters.

The MDs 212–217 may be technology-specific passive monitors that allow the source or destination device to access IP packets. This allows the source and destination devices to be technology independent. For example, the MDs 212–217 have access to an IP packet flow either when each MD connects to a communication line supporting a stream of FR frames carrying the IP packets, or when each MD connects to a line supporting a stream of ATM cells carrying the IP packets. Once a source or destination device accesses the IP packets, it extracts information about the packets.

The VPN supported by the network 200 includes a VPL between CPE1 102 and CPE2 104. The MDs can be placed at any point in the network 200 that supports a packet flow. The term "packet flow" can refer to a variety of end-to-end communications, including, but not limited to, a VPL (i.e., an IP channel between two IP VPN end-points), a socket connection between two IP hosts, all communications between two IP addresses using a particular protocol, or all communications between two IP addresses. A VPN includes a set of VPLs (one VPL in the example of FIG. 2), where each VPL is an IP communications channel between two VPN endpoints, for example CPE1 102 and CPE2 104.

The packet flow of interest may include a stream of IP packets that travel across the networks 106, 110 and 108. These IP packets are exchanged between CPE1 102 and CPE2 104. To transport a single IP packet from one end of the FR network 106 or 108 to the other, the FR network 106 or 108 encapsulates the IP packet in one or more frames. At the boundary between FR and ATM, the router extracts the IP packets and encapsulates them in ALL 5 (ATM Adaptation Layer 5) cells to be carried across the ATM network.

As seen in FIG. 2, the MDs 212–217 can be connected to any point in the network 200 that supports the IP flow. The MDs 212–217 do not have to be the same device from an architectural point of view. For example, MDs 212 and 213 could tap into a FR line, while MDs 214 and 215 could tap into an ATM line, where each MD outputs an IP flow.

Furthermore, each MD 212–217 may be designed to operate independent of each other. For instance, MDs 212 and 214 could be manufactured by different companies. Their function is simply to access frames, cells, etc., for extracting the IP packets. The lack of interdependence between the MDs 212–217 allows a network manager to select a measurement point anywhere in the network supporting the IP flow.

The source-destination device pairings of FIG. 2 allow the performance measurement of the different sections of the network 200. For example, to monitor the performance of the VPN across the FR network 108 and the IP/ATM network 110, the MDs 213 and 216 are located as indicated in FIG. 2. One MD must have a destination device associated with it, while the other must have a source device associated with it. The determination of where to place the destination device and the source device depends on the direction of the packet flow that is to be measured. Assuming that a network manager is interested in measuring the flow of packets sent from CPE2 104 to CPE1 102 at the points indicated by MD 216 and MD 213, the source device 226 is connected to the MD 216 and the destination device 223 to MD 213.

The source device 226 captures IP packets corresponding to the packet flow between CPE2 104 and CPE1 102. MD 216 provides these packets to the source device 226 where they are captured. These packets travel through FR network 108 and through IP/ATM network 110 before being monitored by MD 213. Destination device 223 captures or accesses information related to the packets monitored by MD 213 and stores the captured information in a memory (not shown). The packets further travel across FR network 106 to finally arrive at CPE1 102, establishing a communication channel between CPE1 102 and CPE2 104.

The source device 226 divides the captured packets into logical frames and creates packages corresponding to such frames. The packages include headers from the captured packets. The source device 226 sends these packages to the destination device 223 via an overhead channel (see dotted line connecting source 226 and destination device 223 in FIG. 2). The overhead channel is a reliable path (e.g., a TCP connection) over which monitoring information is transmitted. Packet headers sent from any source device to any destination device via the overhead channel will not suffer packet loss or out of order packet degradation. The destination device 223 receives these packages and correlates them with the stored packets (accessed by MD 213). The destination device 223 uses information from the correlated packages to produce SLA metrics, such as the number of packets lost across the networks 110 and 108 (the monitored networks) and the delay experienced by packets that travel across such networks. Accordingly, the methods and systems consistent with the present invention take advantage of the passive monitoring of the packet flows by the MDs to produce an accurate packet loss measurement in real-time. That is, the SLA metrics are calculated by the destination device 223 in real-time, as opposed to being produced by a central facility (such as DA 116 in FIG. 1) that must process captured packet information off-line.

Another evident advantage of the system of FIG. 2 is that it provides end-to-end SLA metrics by placing a source device 222 and a destination device 227 (along with the respective MDs 212 and 227) at the boundaries of CPE1 102 and CPE2 104, respectively. It will become apparent from the discussion that follows that the package transmission scheme of the present invention does not require an extraordinary number of bits sent over the overhead channel from an IP packet to perform the correlation and calculate the performance parameters. For this same reason (low overhead), the system comprised of the source-destination device pairings [222, 224], [222,227],[225,224], and [226, 223] has a scalable architecture. Because each pairing of source-destination device requires only a small amount of network bandwidth, many pairings can be placed in the network 200 without significant impact on performance of the network 200.

The source-destination device pairing system architecture is also scalable with respect to the number of different flows that can be monitored. Each source or destination device can filter packets based on VPN or other criteria. This capability allows a destination device to be placed in the middle of the network 200 as well as the edge and allows the destination device to produce SLA metrics for multiple VPNs or other flows simultaneously.

FIG. 2 also shows a single destination device 224 receiving packages from different sources 222 and 225. The purpose of this configuration is to monitor the performance of different sections or sub-networks of the network 200.

Figure 3:
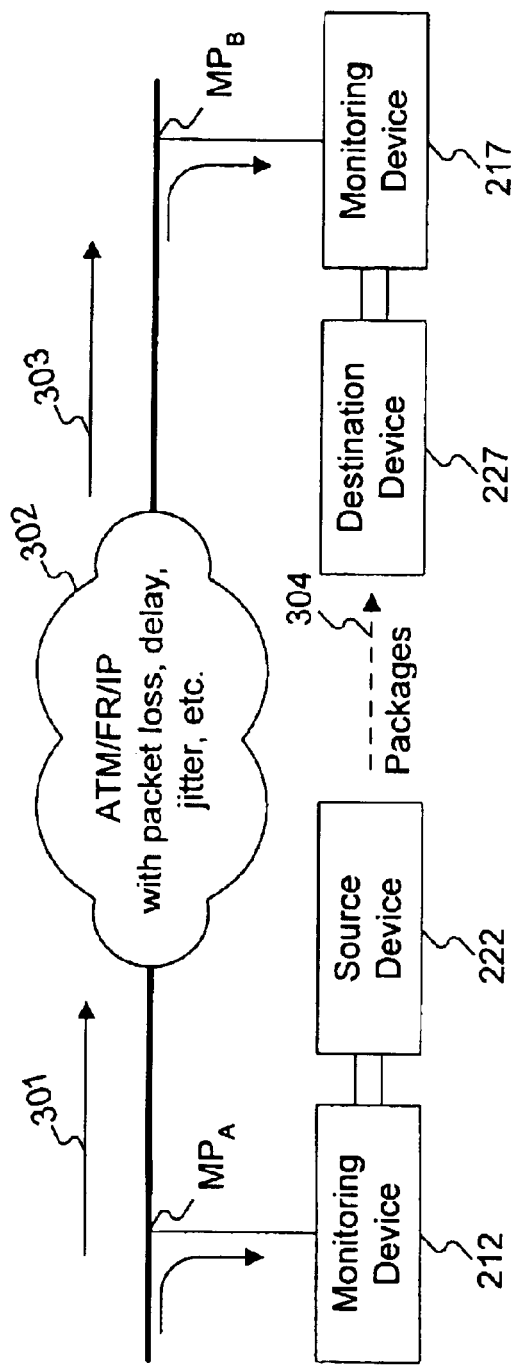
FIG. 3 illustrates monitoring devices, in accordance with methods and systems consistent with the present invention.

FIG. 3 illustrates a simplified block diagram of a source-destination device pair, which monitors a packet flow across a network 302, in accordance with an embodiment of the invention. The block diagram of FIG. 3 shows a Monitoring Device (MD) 212, source device 222, destination device 227, and Monitoring Device 217. The MDs 212 and 217 need not be of the same technology.

The network 302 includes a set of sub-networks (e.g., FR, ATM, etc.) and supports a VPN. The packet flow corresponding to the VPN is monitored by MDs 212 and 217 at points $MP_A$ and $MP_B$. In this embodiment, network 302 may include thousands of VPNs, other than the VPNs of interest, supported through $MP_A$ and $MP_B$.

MD 212 connects to a communications line that supports the packet flow at point $MP_A$ and also connects to the source device 222. The source device 222 connects to the destination device 227 via an overhead channel. The destination device 227 connects to MD 217. MD 217 connects to another communications line that supports the same packet flow at point $MP_B$.

The packet flow is indicated by the arrows 301 and 303 in FIG. 3. Some of the packets that travel across the network 302 may be lost, while others may experience delay, jitter, etc. The destination device 227 determines in real-time the performance of the network 302 by calculating the packet loss, delay, etc. introduced by the network 302. FIG. 3 shows the relationship mentioned above between the packet flows 301 and 303 and the direction 304 of the package transmission.

Figure 4:
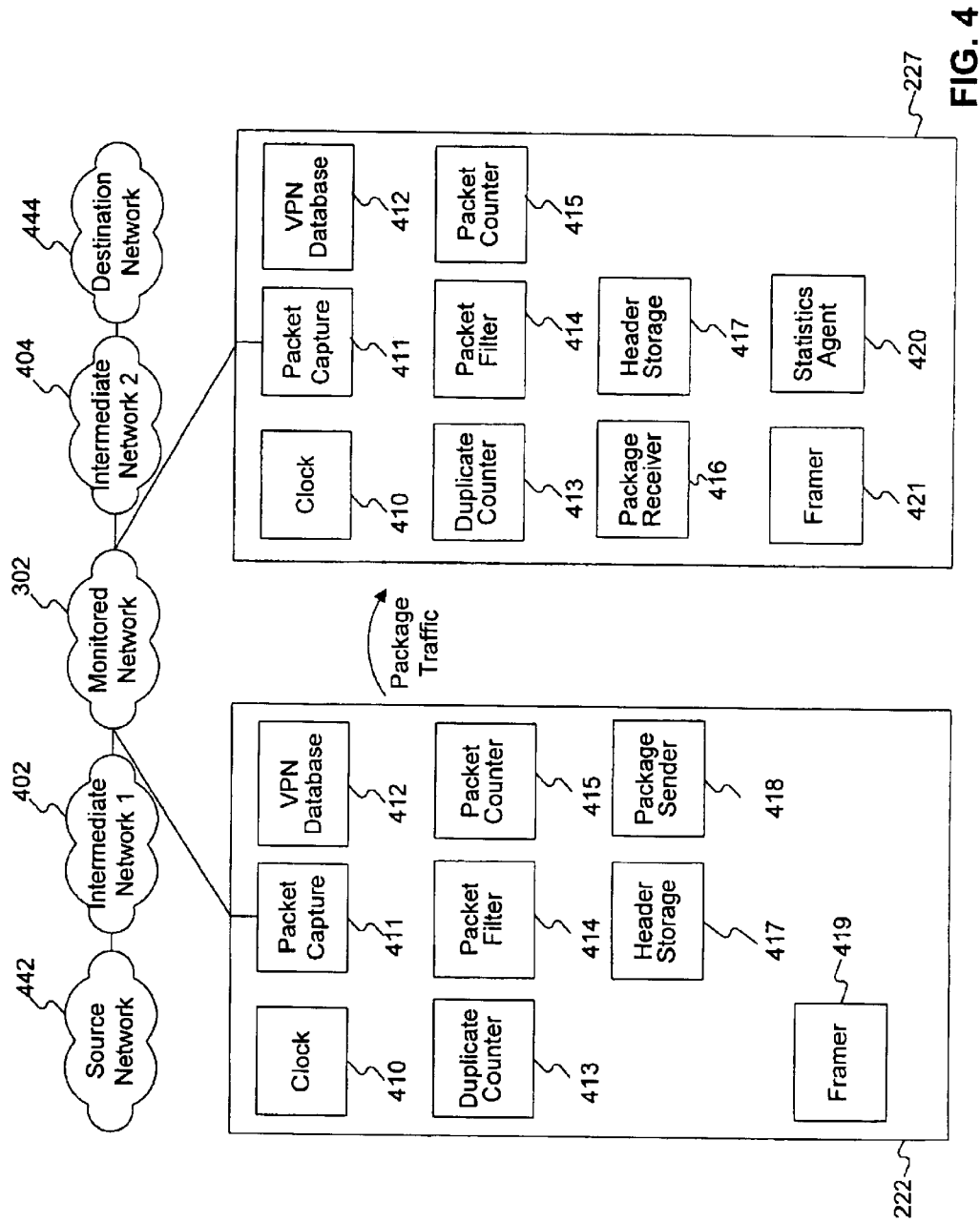
FIG. 4 illustrates a source device and a destination device, in accordance with methods and systems consistent with the present invention.

FIG. 4 shows a detailed block diagram of source device 222 and destination device 27, in accordance with an embodiment of the invention. FIG. 4 shows a source network 42 (for example, CPE1 in FIG. 1), intermediate network 402, source device 222, a monitored network 302, destination device 227, intermediate network 404, and destination network 104 (for example, CPE2 in FIG. 1). The intermediate networks 402 and 404 are shown to illustrate that the source and destination devices monitoring a particular IP flow need not be placed immediately adjacent to the source and destination of that flow. The monitored portion of the network need not be end-to-end.

The source device 222 shown in FIG. 4 includes a processing device having functional modules 410–420. The functional modules in the source device 222 include a clock 410, a packet capture module 411, a VPN database 412, a packet duplicate counter 413, a packet filter 414, a packet counter 415, a header storage 417, a package sender 418, and a framer 419. The functional modules of the destination device 227 are similar to those in the source device 222, except that the destination device 227 does not include a package sender module 418. The destination device 227 includes a package receiver module 416 and a statistics agent 420, and the framer 421 has a different functionality than the framer 419 in source device 222.

The packet capture module 411 obtains packets from MD 212 (shown in FIG. 2). The VPN database 412 includes information about the VPNs from which SLA parameters are measured. In a business application, two companies might each use a VPN for satisfying their communications needs. If both companies desire to obtain SLA metrics by using the destination device 227, then the database 412 must have information identifying each of the VPNs, such as a VPN identifier associated with the companies. If only one company is interested in obtaining the metrics, then the database 412 includes the VPN identifier corresponding to that company's VPN.

The packet filter 414 uses information from the VPN database to filter the headers of packets captured by the capture module 411. That is, the packet headers that form a logical frame from which a package is based are those that are part of a particular VPN. The formation of logical frames is discussed below with reference to FIG. 6 and FIG. 7.

The header storage 417 stores the filtered headers. The clock 410 provides the time (e.g., a time stamp) at which the headers are accessed or captured. The time of capture is stored in the header storage 417 as part of the corresponding header information.

The packet counter module 415 counts the filtered headers. The duplicate counter 413 keeps a count of the number of duplicate headers in the packet flow before the headers arrive at point $MP_A$. When the packet filter 414 selects a header that is the same as a previously selected header, the duplicate counter 413 is incremented. The incremented duplicate count information in the counter 413 is then included in the package. Up to this point, both the source device 222 and the destination device 227 perform the same functions with regards to capturing and storing a packet.

The framer 419 in the source device 222 selects a number of headers in the header storage 417 to form a logical frame. The number of headers selected constitutes the logical frame size. The package sender 418 selects a number of headers in the logical frame to form a package. The package sender 418 transmits this package to the destination device 227 via an overhead channel.

The package receiver module 416 in the destination device 227 waits for packages to arrive from the source device 222. When the package receiver 416 receives a package, it sends the package to the framer 421. The framer 421 searches for a match between a header in the received package and headers stored in the header storage 417 of the destination device 227. When the framer 421 finds a match, framer 421 uses this match to calculate a destination frame size. The framer 421 uses the earliest package-packet match as the start of the destination frame. The combination of the package-packet match and the calculation of the destination frame size represents the correlation between a package and packets monitored at destination device 227.

The framer 421 supplies the calculated frame-size to the statistics agent 420. The statistics agent 420 uses the frame-size information, the headers in header storage 417 (of destination device 227) that matched header information in packages, and information contained in the packages (e.g., time stamps) to calculate network performance statistics.

Figure 5:
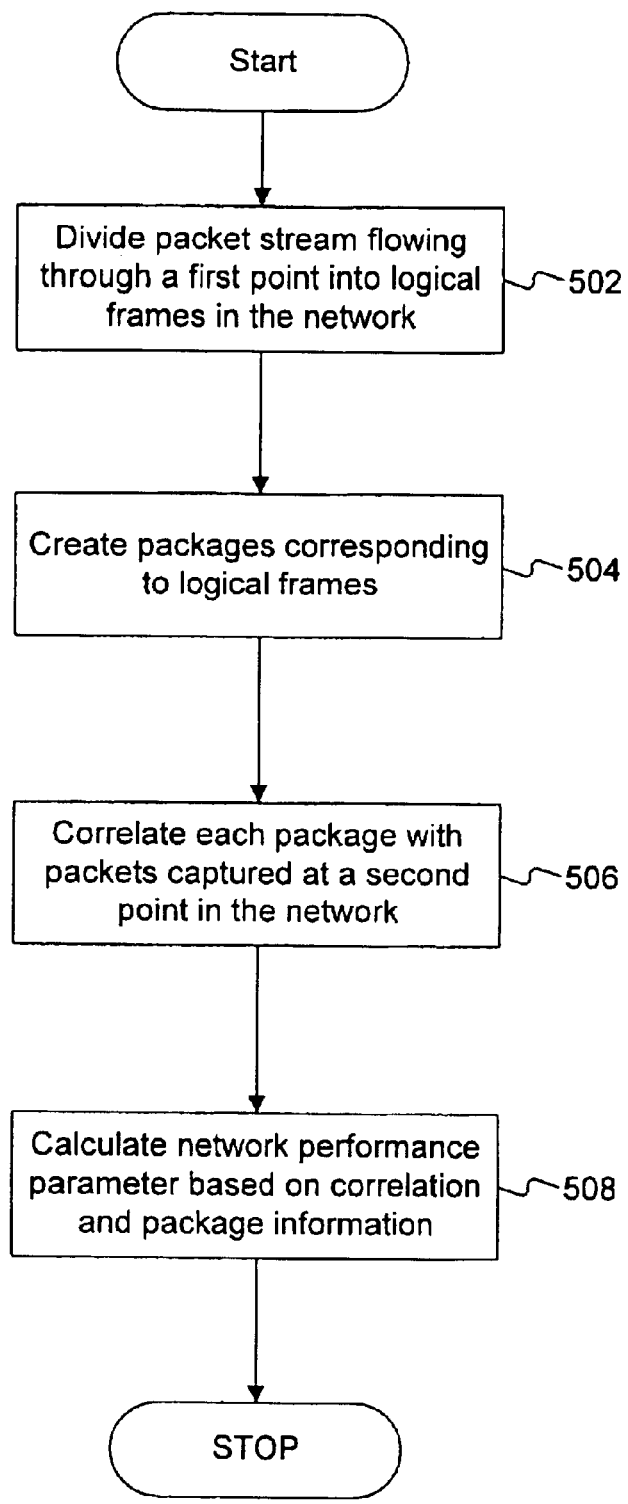
FIG. 5 illustrates a flowchart of a method for measuring network performance, in accordance with methods and systems consistent with the present invention.

FIG. 5 illustrates a flowchart of the steps performed by blocks 222 and 227 for measuring network performance, in accordance with an embodiment of the invention. Step 502 includes dividing a stream of packets flowing through a first point (e.g., $MP_A$ in FIG. 3) into logical frames. Step 504 includes creating packages corresponding to the logical frames. For example, the source device 222 of FIG. 4 may perform the steps 502 and 504.

Step 506 includes correlating each package received with packets captured at a second point in the network (e.g., $MP_B$ in FIG. 3). Finally, step 508 includes calculating the network performance parameters based on correlation information (including the headers that were matched) and package information. For example, the destination device 227 of FIG. 4 may perform the steps 506 and 508. While the flowchart of FIG. 5 shows a single run through the steps comprising the method of the present invention, an implementation of the same should be in the form of a continuous loop in, order to perform the operations in real-time.

Figure 6:
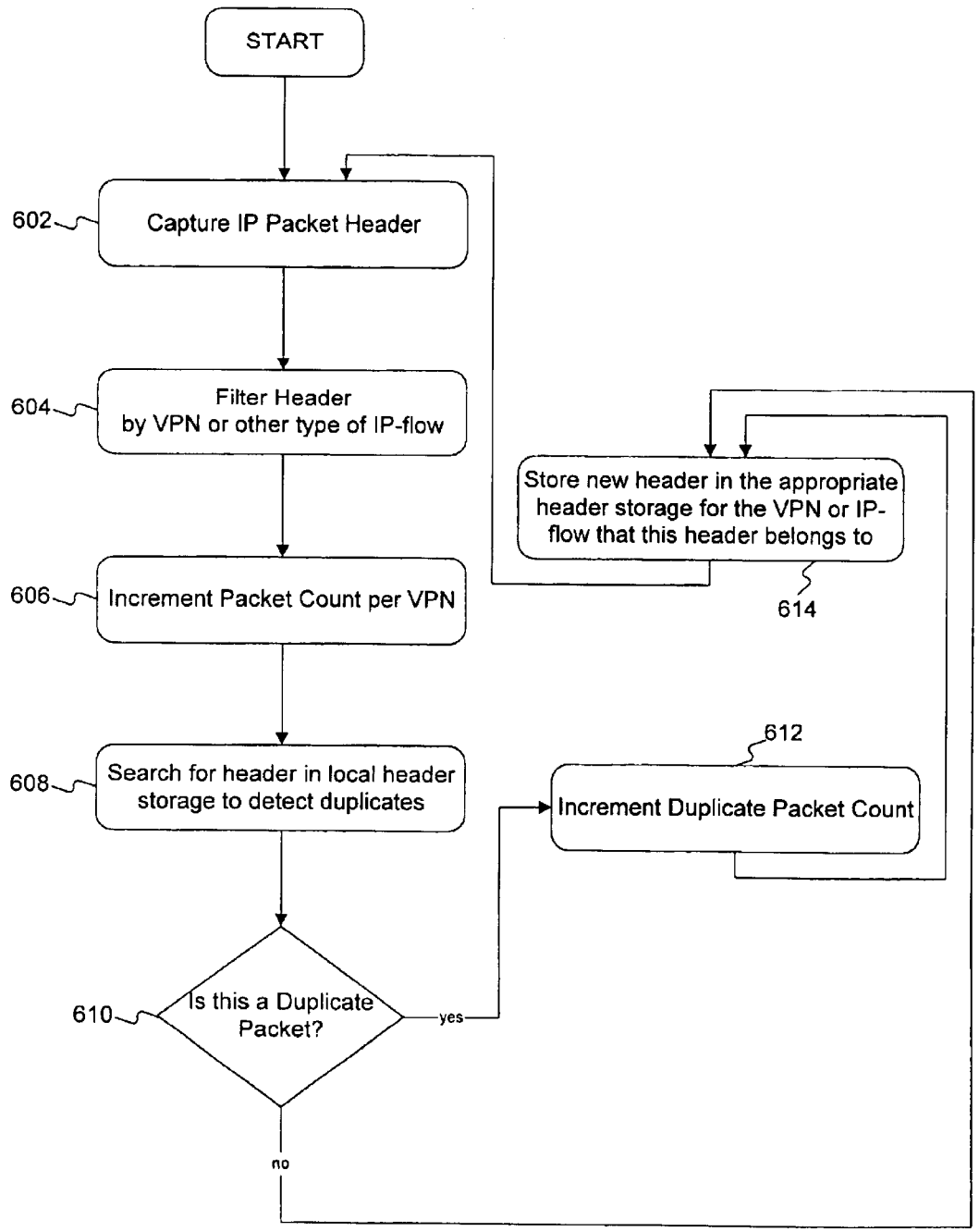
FIG. 6 illustrates a flowchart of a method for dividing a packet stream into logical frames, in accordance with methods and systems consistent with the present invention.
Figure 7:
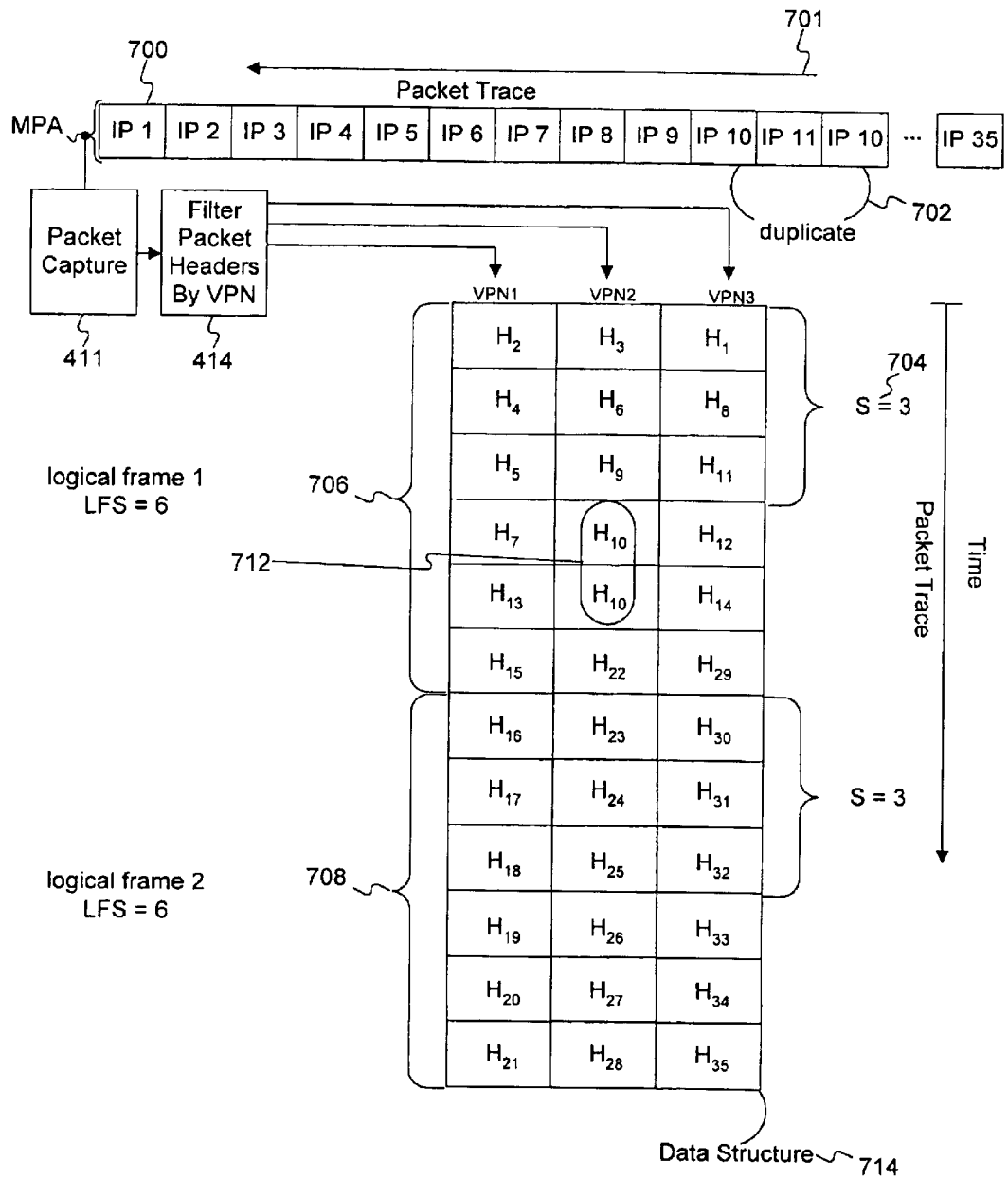
FIG. 7 illustrates an implementation of the method of FIG. 6, in accordance with methods and systems consistent with the present invention.

FIG. 6 illustrates a flowchart that implements step 502 in FIG. 5 as well as duplicate packet count and packet count functions. Step 602 includes capturing an IP packet header. Step 604 includes filtering the captured header by VPN or other type of IP-flow. Step 604 includes selecting the header of the captured packet for further processing if the header corresponds to the packet flows for which SLA metrics are calculated. If the captured packet is not associated with a packet flow of interest, the packet is filtered out (e.g., discarded). FIG. 7 illustrates an embodiment in which all of the packets shown are part of packet flows of interest (i.e., no captured packet is discarded).

Once the header is selected and associated with a VPN, a packet count associated with that VPN is incremented (step 606). Step 608 includes searching for headers in the local header storage to detect duplicates. Step 610 includes determining whether the selected header is found in the header storage. If no duplicates are found, then the selected header is stored in a header storage location associated with the VPN corresponding to the header (step 614). If a duplicate header is found in the header storage, a duplicate packet count increments (step 612) and the selected header is stored as described above with respect to step 614. The duplicate packet count is stored in another memory location and is included as part of the information contained in a package. The package creation process will be described with respect to FIG. 8.

The method of FIG. 6 is performed continuously. The method is performed when all of the steps disclosed in FIG. 6 have been carried out, and the flowchart points back to reinitiate the process with the capture packet header step 602.

The destination device 227 also performs the same steps disclosed in FIG. 6. This method is carried out in the destination device 227 in order to capture headers at the second point in the network ($MP_B$), and thus creating a data structure with information obtained from the packet flow.

FIG. 7 shows one implementation of FIG. 6, where packets in a packet trace are captured by the packet capture module 411 at measuring point $MP_A$, in accordance with an embodiment of the invention. FIG. 7 illustrates a packet flow 700, a measurement point $MP_A$, a packet capture module 411, a packet filter module, and a header storage 714. The packet trace includes packets corresponding to three packet flows of interests VPN1, VPN2 and VPN3. In this example, no packets are discarded by the packet filter since all packets in this packet trace belong to one of the VPNs. In general, this may not be the case.

All three flows in the packet trace travel in the same direction, as indicated by the arrow 701. Note that packet IP10 in the packet trace is duplicated, as indicated by the numeral 702.

The filter 414 selects headers from the captured packets and groups them under their corresponding VPN. The logical column identified by VPN1 stores the headers associated with a VPN identifier corresponding to VPN1. Similarly, the logical columns identified by VPN2 and VPN3 store headers associated with their respective VPN identifiers.

FIG. 7 shows that the headers H1–H35 in storage locations of data structure 714 are stored in their corresponding logical columns according to the order in which they are captured. Alternatively, the information about the order in which the headers are captured can also be obtained by assigning a time stamp or sequence number to each header.

There is a total of two logical frames in FIG. 7 for each VPN. The logical frame for VPN1 includes the header sequence H2H4H5H7H13. The logical frame size of frame 706 is six. Each logical frame created has associated with it a logical frame number as shown in FIG. 7.

Both of the duplicate headers 712 corresponding to the duplicate packets 702 are stored in the header storage location in the data structure 714. A package corresponding to the logical frame 706 corresponding to the VPN2 includes the number of duplicate packets, but not necessarily the duplicate headers 712 themselves.

A package corresponding to the logical frame 706 of VPN2 includes a predetermined number 704 of headers in the logical frame. In the present example, the number of headers is three. This package includes the sequence of headers H3H6H9.

The package further includes the number 704 of headers in the package, the logical frame size, the logical frame number of the frame corresponding to the package, and the VPN identifier (e.g., VPN2, etc.). The package further includes a flow identification number. The flow identification number is not shown in FIG. 7 because the example illustrated therein assumes a single flow per VPN.

Further, the package includes the number of duplicate packets in a logical frame. Note that in the present example none of the duplicate headers in the logical frame are included in the package.

Figure 8:
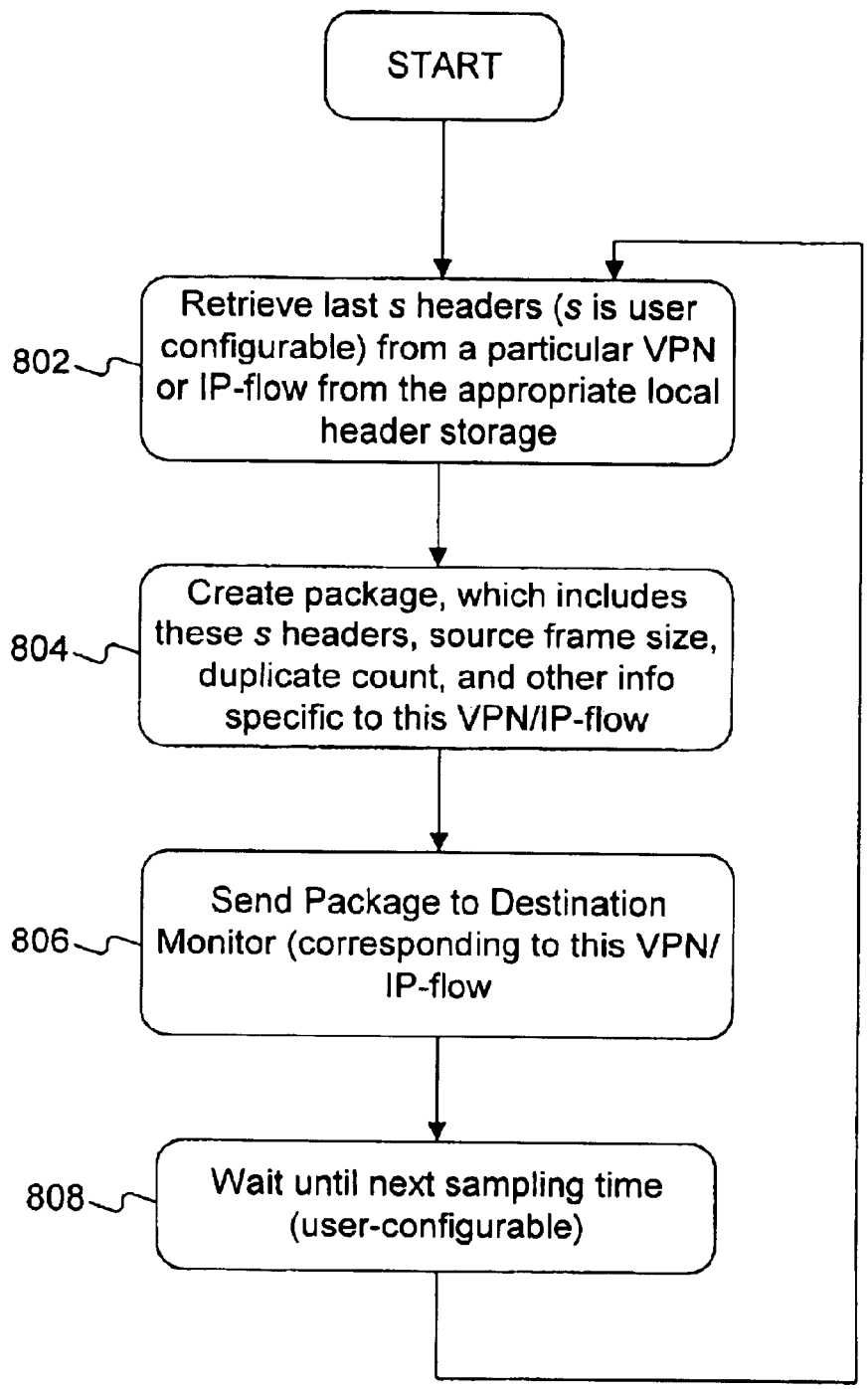
FIG. 8 illustrates a flowchart of a method for creating packages corresponding to the logical frames, in accordance with methods and systems consistent with the present invention.

FIG. 8 illustrates a flowchart for implementing step 504 in FIG. 5 (i.e., creating packages corresponding to the logical frames), in accordance with an embodiment of the present invention. Step 802 includes retrieving the s last (or most recently captured) number of headers from a particular VPN (or from an IP packet flow associated with a VPN) from the appropriate header storage. The number s is configured by a user and assumes a value of three in FIG. 7.

Step 804 includes creating a package. The package is a sequence of bits that corresponds to the s headers, the source frame size (i.e., the size of logical frame in FIG. 7), a duplicate packet count, and other information specific to the VPN (e.g., VPN identifier and packet flow identifier).

Step 806 includes sending the package that corresponds to the VPN (or IP packet flow in the VPN) to the destination device 227. Step 808 includes waiting x number of seconds before creating a new package, where x may be configured by the user. x is defined as the sampling time for a VPN, and is the difference between the time at which a packet capture module in the source device 222 starts capturing packets to form a logical frame corresponding to that VPN and the time at which the packet capture module starts capturing packets to form the next logical frame corresponding to that VPN. Assuming that a logical frame is created within a time period that is less than the sampling time, the number x represents the sampling time.

Figure 9:
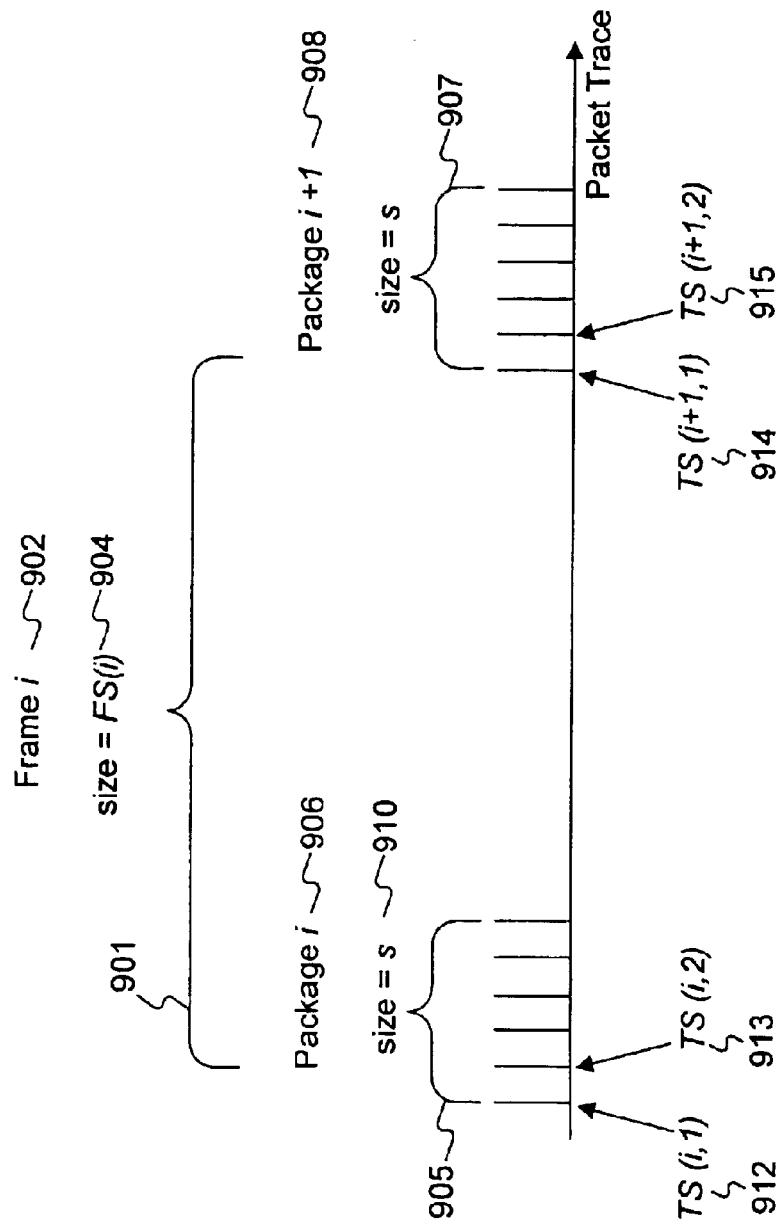
FIG. 9 illustrates time stamps in a package, in accordance with methods and systems consistent with the present invention.

FIG. 9 illustrates the time stamps in a package, in accordance with an embodiment of the invention. FIG. 9 shows a logical frame 901 and its corresponding package 905, a second package 907 sent after package 905, and time stamps 912–915.

The frame 901 includes a frame number i (Frame i, 902) associated with it as well as a frame size (FS(i), 904). Package 905 includes a package number i (Package i, 906) that is the same as the frame number 902 of the corresponding frame. Package 907 includes a package number (Package i+1, 908) that is greater than the package number 906, indicating that package 907 is transmitted after package 905.

FIG. 9 shows only the header information in the packages. This is done for illustrative purposes to show that the package size s is the number of headers 910 in the package and does not take into account any other information that may be included in the package. Each header is represented by a vertical line in the package and corresponds to the header information fields 1006–1009 in FIG. 10.

Each header information field has an associated time stamp (TS). The TS is the time at which the packet containing the header was captured. The TS for the first captured header in package 905 is TS(i,1) 912, while the TS for the second captured header in package 905 is TS(i,2) 913. Similarly, the TS for the first captured header in package 907 is TS(i+1,1) 912, while the TS for the second captured header in package 907 is TS(i,2) 913. TS 912 represents the earliest time while TS 915 represents the latest time.

FIG. 10 illustrates a data structure of a package, in accordance with an embodiment of the present invention. The source device 222 sends the package to the destination device 227. The information fields in the storage locations include a flow identifier 1003, a frame number 1004, the package size 1005, and header information fields 1006–1009, which include time stamps.

If a VPN has different packet flows associated with it, the packet flow identifier information is inserted in field 1003. The network performance is measured in the destination device 227 for the packet flow indicated in the package 1003.

The frame number 1004 is simply the logical frame number from which the package is created. The package size field 1005 contains the number of headers in the package.

The header information fields 1006–1009 include IP header information as well as time stamps. The IP header information includes the source address, destination address, IP identifier, fragment flag, fragment offset, a locally-generated sequence number, and a running duplicate count. The running duplicate count reflects the duplicate packets entering the monitored network as opposed to the number of packets duplicated as a result of passing through the monitored network.

The IP header information is used for synchronization and frame alignment. Synchronization refers to the identification of the same IP packets observed from the two Measurement Points of the IP VPN. One way to achieve synchronization is to find some way to uniquely identify an IP packet. Conventional techniques use a cyclic redundant checksum (CRC) calculated over the entire IP packet to uniquely identify packets for matching purposes. The disclosed method does not require CRC computation and thus saves substantial processing time. For example, for a properly constructed EP stream, a combination of the source and destination IP addresses (32 bits for each), the IP identifier field (16 bits), the fragment flag (3 bits), the fragment offset (13 bits), and the source and destination port numbers uniquely identifies an IP packet within a VPN. The IP identifier is unique within the IP flow identified by the source and destination addresses if there is no fragmentation. If there is fragmentation along the VPN path, a fragment offset and a fragment flag may also be needed to uniquely identify the packet. Additional processing may be required to account for any fragmentation that occurs along the VPN path.

Figure 11:
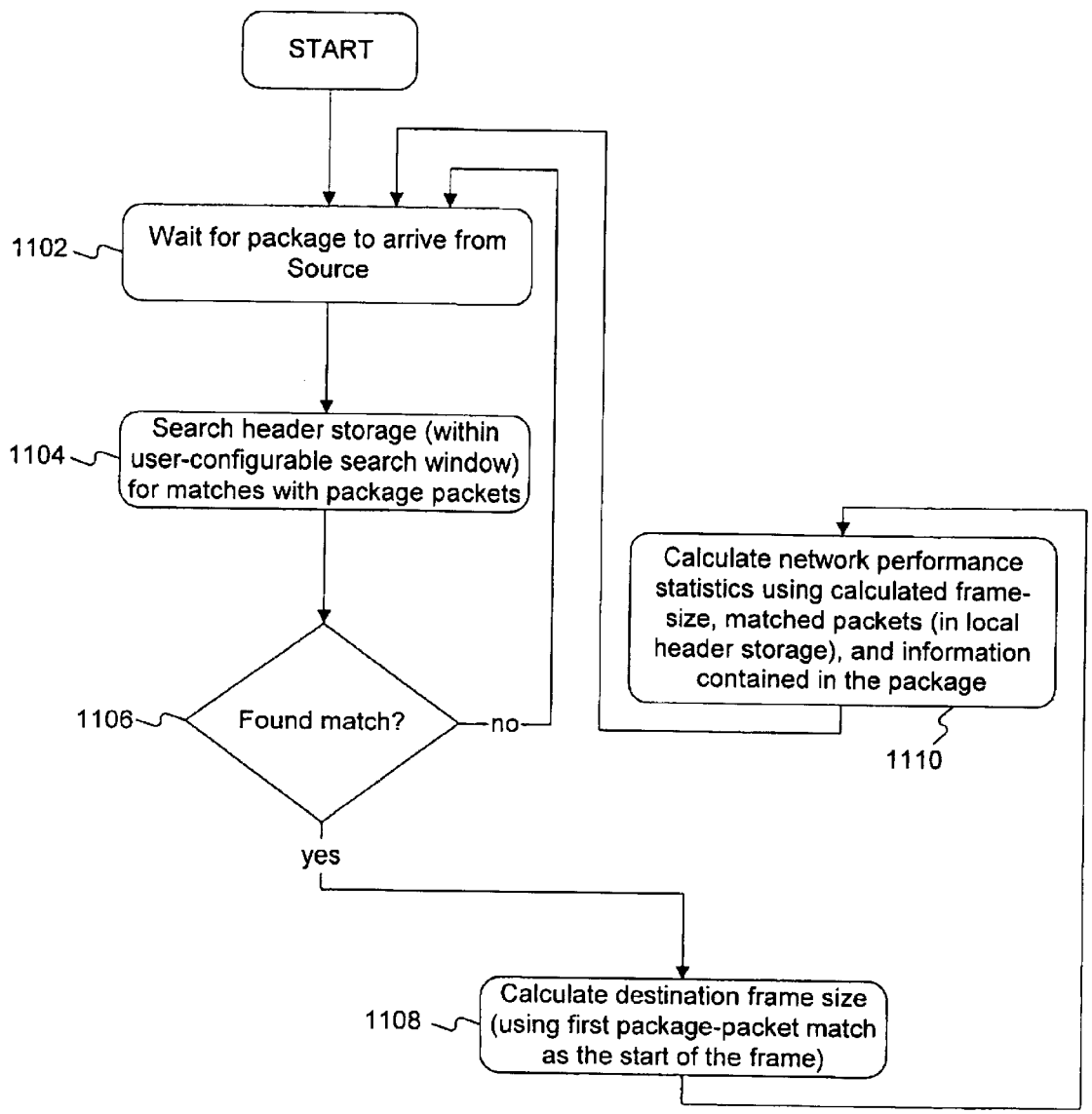
FIG. 11 illustrates a flowchart of a method for correlating packages and for calculating performance parameters, in accordance with methods and systems consistent with the present invention.

FIG. 11 illustrates a flowchart for implementing steps 506 and 508 in FIG. 5 (i.e., correlating packages with packets captured by the destination device 227 and calculating network performance parameters based on the correlation), in accordance with an embodiment of the invention. Step 1102 includes waiting for a package to arrive from the source device 222. Once a package arrives from the source device 222, the destination device 227 searches for headers in its header storage that match the headers in the received package (step 1104). As mentioned above, the destination device 227 uses a method that is identical to that illustrated in FIG. 6 in order to capture packets at a second point in the network and to store the corresponding headers in the header storage. The destination device 227 starts to capture headers at an arbitrary point in time. In one embodiment, a hash table (hashed on the IP identifier) is the data structure used to store headers at the destination monitor. This data structure facilitates efficient matching, as required by step 1104.

If the destination device 227 finds headers in its header storage that match the headers in the received package (step 1106), then the destination device 227 calculates the destination frame size (step 1108). The destination frame size is the number of packets in between a first match of a previously received package with a header stored in the destination device 227 and a first match of a presently received package with another header stored in the destination device 227. Matching the packages to the headers and calculating the destination frame size constitutes the correlation step in FIG. 5.

Step 1110 includes calculating network performance statistics using the calculated frame-size, the matched packets in the destination device 227 header storage, and other information contained in the package. To calculate the number of packets lost when traveling from one point (e.g., $MP_A$ in FIG. 3) to another (e.g., $MP_B$ in FIG. 3), the destination device 227 uses the following formula: source_frame_size−(calculated_destination_frame_size−calculated_duplicate_count). The "source_frame_size" is the frame size included in the package (1005 in FIG. 10). The "calculated_duplicate_count" is the number of packets duplicated between the source and destination Mps; its calculation is discussed in detail below. This information can then be used to calculate the availability of the VPN. Specifically, the availability is computed as the percentage of the total time that the packet loss exceeds a given level. The time resolution of the availability is limited by the frequency of the loss computation.

Every IP packet is associated with a time stamp that is local to the monitoring devices. The difference between the time stamps corresponding to the same packet at $MP_A$ and $MP_B$ gives the delay from $MP_A$ to $MP_B$ for that IP packet. Because the time stamps are local to the monitoring devices, the accuracy of this delay measurement depends on the synchronization of the two devices. This information can then be used to calculate average delay as well as jitter.

Another performance statistic calculated in step 1110 is the number of packets that duplicate when passing through the monitored network. There might be two instances when the IP packets duplicate. The first such instance is when the packet is between points $MP_A$ and $MP_B$. The second such instance is before the packet flow hits the monitoring device (at $MP_A$) associated with the source device 222. The performance parameter of interest is the number of duplicate packets that results from the transport of the packet flow through the monitored network. To calculate the parameter, the source device 222 keeps a running count of the number of duplicate packets that are entering the monitored network (second instance). The destination device 227 also keeps a running count of the number of duplicates passing by the measurement point $MP_B$. The destination device 227 count is independent from the source device 222 count. The destination device 227 uses the running duplicate counts to calculate current-frame duplicate counts for both the source and destination MPs. The destination device 227 duplicate count represents the number of packets that are duplicated before reaching $MP_A$ and the number of packets that are duplicated in the monitored network, since the destination device 227 has no way of independently distinguishing between packets duplicated before entering the monitored network and packets duplicated within the monitored network. The destination device 227 simply subtracts the source device 222 current-frame duplicate count from the destination device 227 current-frame duplicate count to determine the duplicates created by the monitored network for the current frame.

FIG. 12 shows a header storage data structure 1200 in the destination device 227, in accordance with an embodiment of the invention. The data structure contains a VPN identifier field 1201, a flow identifier 1202, last frame number field 1203, packet index FB 1204, packet index FC 1205, the number of duplicate packets 1206, and headers 1207–1211.

The flow identifier 1202 was discussed above with reference to FIG. 10. The last frame number field 1203 is the frame number (1004 in FIG. 10) corresponding to the most recently received package.

The packet index FB 1204 refers to the locally-generated sequence number of a packet at the start of the current destination frame. The packet index FB is the reference point (first match) from which the destination frame size is calculated.

The packet index FC 1205 refers to the locally-generated sequence number of the packet that is most recently recorded by the destination device 227. When a packet match is found in the current package, the destination frame size is calculated as the difference between the sequence number of the matched packet and index FB. This currently-matched sequence number then becomes the new "index FB" for use in calculating the next destination frame size.

Field 1206 represents the running duplicate count at the start of the current frame. The running duplicate count field in lines 1207–1211 is the running duplicate count at the time of arrival of the respective packet.

Finally, the labels 1207–1211 represent the headers stored in the destination device 227 header storage area. The number of headers that are stored in the destination device 227 may differ from the number of headers stored in the source device 222 for reasons that follow.

The logical framing algorithm runs periodically at the source device 222 with a separate process running for each monitored packet flow. At the destination device 227, the destination framing algorithm is triggered by the periodic reception of packages from the source device 222. Each package corresponds to a specific IP packet flow and invokes a separate destination process.

For a specific IP packet flow, the source device 222 gathers the most recent s headers after a specified amount of time (sampling time) since the last iteration of the framer. The header information is placed in a package that is sent to the destination device 227. The current source frame is defined by the source device 222 as ending with the header preceding the first header included in the package. The next source frame is consequently defined as starting with the first header included in the package. Included in the package is information identifying the IP packet flow and information pertaining to the current frame, such as a packet count, duplicate count, and frame number.

When the package is received at the destination device 227, the destination framing algorithm begins. The first step is to match one of the package headers with the headers stored locally at the destination device 227. Due to the nature of the intervening IP network, the headers stored at the destination device 227 corresponding to the package may be out of order with respect to the sequence of package headers or missing. To compensate for this, the goal is to find as many of the package headers in our local storage as possible. This is the reason that the number of headers 1207–1211 may be greater than the number of headers in the source device 222. The destination device 227 selects the one header for which the matched header in local storage is the earliest received header. This header is defined by the destination device 227 as ending the current destination frame and starting the next destination frame (in particular, this header belongs to the next destination frame). The destination device 227 can now independently calculate various destination frame statistics, such as packet count, duplicate count, etc. These statistics are then compared to the analogous statistics of the current source frame received in the package to calculate various network performance statistics.

Figure 13:
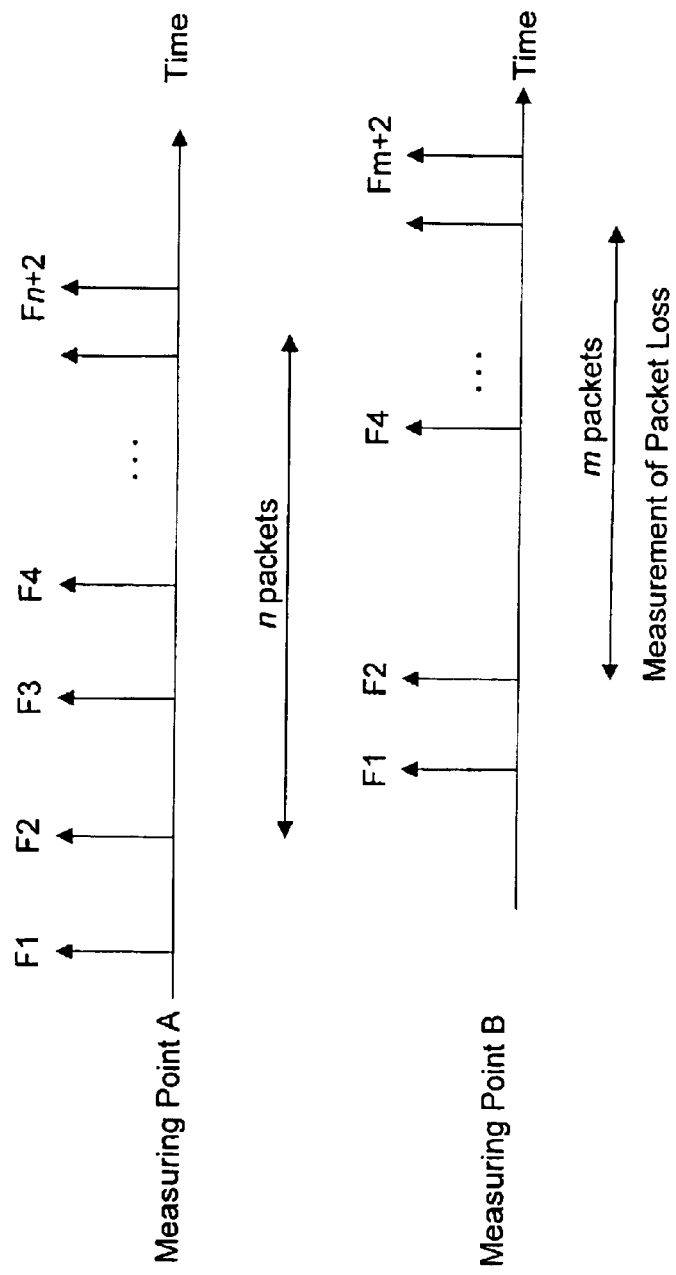
FIG. 13 illustrates the measurement of packet loss, in accordance with methods and systems consistent with the present invention.

FIG. 13 illustrates a high-level diagram of a packet loss measurement, in accordance with an embodiment of the invention. The destination device 227 is only concerned with lost packets. One can then designate the frame size of n packets, delineated by two framing patterns, $F_1$ and $F_{n+2}$, at $MP_A$. A framing pattern may include a sequence of bits corresponding to the source address, destination address, IP identifier field, fragment flag, and fragment offset of the headers. When the same two framing patterns are observed at $MP_B$ with a packet count of m packets between them, the packet loss count of n minus m packets can then be computed.

The foregoing description of preferred embodiments of the present invention provides an exemplary illustration and description, but is not intended to be exhaustive or to limit the invention to the precise form disclosed. Modifications and variations are possible in light of the above teachings or may be acquired from practice of the invention.

What is claimed is:

1. A method for measuring network performance comprising the steps of:
    dividing packets flowing through a first point into frames, the first point being any point in the network that supports a packet flow, said dividing step comprising:
        selecting a header associated with the packets flowing through the first point;
        associating the header with the packet flow;
        storing the header in a storage associated with the packet flow;

incrementing a packet count; and
detecting duplicate packets generated by network nodes;
capturing information n about the packets in packages that correspond to the frames;
correlating each package with packets flowing through a second point, the second point being any other point in the network that supports the packet flow; and
calculating network performance information based on the correlated packages.

2. A method for measuring network performance, comprising the steps of:
dividing packets flowing through a first point into frames, the first point being any point in the network that supports a packet flow, and dividing steps comprising selecting a header associated with the packets flowing through the first point;
associating the header with the packet flow;
storing the header in a storage associated with the packet flow;
incrementing a packet count; and
detecting duplicate packets, wherein the detecting steps comprises searching in storage for another header that matches the selected header;
capturing information about the packets in packages that correspond to the frames;
correlating each package with packets flowing through a second point, the second point being any other point in the network that supports the packet flow; and
calculating network performance information based on the correlated packages.

3. A method for measuring network performance, comprising the steps of:
dividing packets flowing through a first point into frames, the first point being any point in the network that supports a packet flow; said dividing step comprising selecting a header associated with the packets flowing through the first point;
associating the header with the packet flow;
storing the header in a storage associated with the packet flow;
incrementing a packet count; and
detecting duplicate packets;
capturing information about the packets that correspond to the frames;
correlating each package with packets flowing through a second point, the second point being any other point in the network that supports the packet flow; and
calculating network performance information based on the correlated packages; and
wherein a duplicate packet count is incremented when a duplicate packet is detected.

4. A method for measuring network performance, said method comprising the steps of:
dividing packets flowing through a first point into frames, the first point being any point in the network that supports a packet flow; said dividing step comprising selecting a header associated with the packets flowing through the first point;
associating the header with the packet flow; and
storing the header in a storage associated with the packet flow, wherein the storing step is repeated to form sequences of headers in the storage;
capturing information about the packets in packages that correspond to the frames;
correlating each package with packets flowing through a second point, the second point being any other point in the network that supports the packet flow; and
calculating network performance information based on the correlated packages.

5. The method of claim 4, wherein the step of storing the header further comprises storing header order of capture information in a second storage associated with the selected header.

6. The method of claim 4, wherein the headers in the storage are stored in the form of a hash table data structure.

7. A method of for measuring network performance, comprising:
dividing packets flowing through a first point into frames, the first point being any point in the network that supports a packet flow;
capturing information about the packets in packages that correspond to frames;
correlating each package with packets flowing through a second point, the second point being any point in the network that supports the packet flow and
calculating network performance information based on the correlated packet; and
wherein the step of capturing information comprising the steps of
retrieving consecutive headers from a frame and
forming a package including information that uniquely identifies consecutive packets corresponding to the consecutive headers, the step of forming a package comprising setting the package size to represent the number of packets in the package.

8. A method for measuring network performance comprising:
dividing packets flowing through a first point into frames, the first point being any point in the network that supports a packet flow;
capturing information about the packets in packages that corresponds to the frames;
correlating each package with packets flowing through a second point, the second point being any point in the network that supports the basket flow; and
calculating network performance information based on the correlated packages; and
wherein the step of capturing information comprises the steps of
retrieving consecutive headers from a frame and
forming a package including information that uniquely identifies consecutive packets corresponding to the consecutive headers, the step of forming a package comprising selecting a source information, a destination information, an Internet Protocol identifier, a fragment flag, and a fragment offset from each packet in the package as the information that uniquely identifies consecutive packets corresponding to the consecutive headers.

9. A method for measuring network performance comprising:
dividing packets flowing through a first point into frames, the first point being any point in the network that supports a packet flow;
capturing information about the packets in packages that correspond to the frames;
correlating each package with packets flowing through a second point, the second point being any point in the network that supports the packet flow; and calculating network performance information based on the correlated packages; and wherein the step of capturing information comprises the steps of
retrieving consecutive headers from a frame
forming a package including information that uniquely identifies consecutive packets corresponding the consecutive headers, the step of retrieving comprising receiving the last n headers in the frame, n being an integer number.

10. A method of for measuring network performance, said method comprising the steps of:
dividing packets flowing through a first point into frames, the first point being any point in the network that supports a packet flow;
capturing information about the packets in packages that correspond to the frames;
correlating each package with packets flowing through a second point, the second point being any other point in the network that supports the packet flow; and
calculating network performance information based on the correlated package, said method further comprising
storing in a storage header associated with the packets flowing through the second point, the step of storing comprising
selecting the header;
associating the header with the packet flow; and
storing the header in a storage location associated with the packet flow.

11. A method for measuring network performance comprising:
dividing packets flowing through a first point into frames, the first point being any point in the network that supports a packet flow;
capturing information about the packets in packages that correspond to the frames;
correlating each package with packets flowing through a second point, the second point being any point in the network that supports the packet flow;
storing in a storage a header associated with the packets flowing through the second point, said storing step comprising selecting the header, associating the header with the packet flow, storing the header in a storage location associated with the packet flow, incrementing a packet count, and detecting duplicate packets generated by network nodes; and
calculating network performance information based on the correlated packets.

12. A method for measuring network performance comprising:
dividing packets flowing through a first point into frames, the first point being any point in the network that supports a packet flow;
capturing information about the packets that correspond to the frames;
correlating each package with packets flowing through a second point, the second point being any point in the network that supports the packet flow;
storing in a storage a header associated with the packets flowing through the second point, said storing step comprising selecting the header, associating the header with the packet flow, storing the header in a storage location associated with the packet flow, incrementing a packet count, and detecting duplicate packets, the detecting step comprising searching in the storage for another that matches the selected header; and
calculating network performance information based on the correlated packets.

13. A method for measuring network performance comprising:
dividing packets flowing through a first point into frames, the first point being any point in the network that supports a packet flow;
capturing information about the packets in packages that correspond to the frames;
correlating each package with packets flowing through a second point, the second point being any point in the network that supports the packet flow;
storing in a storage a header associated with the packets flowing through the second point, said storing step comprising selecting the header, associating the header with the packet flow, storing the header in a storage location associated with the packet flow, incrementing a packet count and detecting duplicate packets; and
calculating network performance information based on the correlated packets; and
wherein a duplicate packet count is increment when a duplicate packet is detected.

14. A method for measuring network performance, said method comprising the steps of:
dividing packets flowing through a first point into frames, the first point being any point in the network that supports a packet flow;
capturing information about the packets in packages that correspond to the frames;
correlating each package with packets flowing through a second point, the second point being any other point in the network that supports the packet flow;
storing in a storage a header associated with the packets flowing through the second point, the step of storing the header in a storage location is being repeated to form a sequence of headers in the storage;
storing header order of capture information in a second storage, the second storage being associated with the selected header; and
calculating network performance information based on the correlated packages.

15. A method for measuring network performance comprising:
dividing packets flowing through a first point into frames, the first point being any point in the network that supports a packet flow;
capturing information about the packets in packages that correspond to the frames;
correlating each package with packets flowing through a second point, the second point being any point in the network that supports the packet flow, the correlating step comprising associating each package with the packet flow, searching for a match between packet information selected in each packet and stored header information corresponding to the packet flow, and calculating a destination frame size; and
calculating network performance based on the correlated packages.

16. The method of claim 15, wherein the step of calculating a destination frame comprises determining a number of packets in between a match of a previous package and a match of present package.

17. The method of claim 15, the searching step comprises examining a number of stored packet headers in the storage.

18. A method for measuring network performance comprising:
dividing packets flowing through a first point into frames, the first point being any point in the network that supports a packet flow;
capturing information about the packets in packages that correspond to the frames;
correlating each package with packets flowing through a second point, the second point being any point in the network that supports the packet flow; and
calculating network performance information based on tire correlated packages, the step of calculating comprising determining a number of packets lost between the first point and the second point, the step of determining the number of packets lost comprising
determining a source frame size from a correlated package;
calculating a destination frame size;
subtracting the destination frame size from the source frame size; and
adding a number of duplicate packets generated between the first point and second point in the network to the subtraction of the destination frame size from the source frame size.

19. A method for measuring network performance, said method comprising the steps of:
dividing packets flowing through a first point into frames, the first point being any point in the network that supports a packet flow;
capturing information about the packets in packages that correspond to the frames;
correlating each package with packets flowing through a second point, the second point being any other point in the network that supports the packet flow; and
calculating network performance information based on the correlated packages, the step of calculating network performance comprising determining a delay experienced by a packet flowing from the first point to the second point in the network, the step of determining the delay comprising
determining a first time at which a packet associated with a correlated package flows through tire first point in the network;
determining a second time at which the packet associated with the correlated package flows through the second point in the network; and
subtracting the first time from the second time.

20. A method for measuring network performance comprising:
dividing packets flowing through a first point into frames, the first point being any point in the network that supports a packet flow;
capturing information about the packets in packages that correspond to frames;
correlating each package with packets flowing through a second point, the second point being any point in the network that supports the packet flow; and
calculating network performance information based on the correlated packages, the step of calculating network performance comprising calculating a number of duplicate packets created between the first point and the second point.

21. The method of claim 20, wherein the step of calculating the number of packet duplicates comprises:
counting duplicate packets at the first point;
counting duplicate packets at the second point; and
subtracting the count of duplicate packets at the first point from the count of duplicate packets at the second point.

22. A method for measuring network performance, said method comprising the steps of:
retrieving packet headers from a first class of packets at a first point in the network, the first point being any point in the network that supports a flow of either the first class of packets or a second class of packets carrying information corresponding to the packets of the first class;
selecting pocket headers retrieved at the first point that correspond to a packet flow;
maintaining a first header store to stored the selected headers as the first class of packets flow through the first point;
retrieving packet headers from the first class of packets at a second point in the network, the second point being any other point in the network that also supports the flow of either the first class of packets or the second class of packets;
selecting packet headers retrieved at the second point that correspond to the packet flow;
maintaining a second header storage to stored the selected headers as the first class of packets flow through the second point;
creating a package of information from the first header storage;
sending the package to a monitor associated with the retrieval of packet headers at the second point;
correlating the package with information from the second header storage; and
calculating network performance information using a result of the correlation.

23. A system for measuring network performance comprising:
at least a first and a second monitoring device for monitoring a packets associated with a plurality of packet flows and connected to any point in the network; and
at least a first and a second processing device for determining network performance information, each processing device being respectively connected to each of the first and second monitoring devices, and
wherein the first processing device comprises a source device that divides packets accessed via the first monitoring device into frames and captures information about the packets in packages corresponding to frames, and the second processing device comprises a destination device that correlates each package with packets accessed via the second monitoring device and calculates the network performance based on the correlated packages, wherein the monitoring devices monitor a packet flow from the plurality of packet flows, and
wherein the captured information about the packets comprises:
source information;
destination information;
an Internet Protocol identifier;
a fragment offset; and
a fragment flag.

24. A system for measuring network performance comprising:
- at least a first and a second monitoring device for monitoring packets associated with a plurality of packet flows and connected to any point in the network; and
- at least a first and a second processing device for determining network performance, each processing device being respectively connected to each of the first and second monitoring devices; and
- wherein the first processing device comprises a source device that divides packets accessed via the first monitoring device into frames and captures information about the packets in packages corresponding to frames, and the second processing device comprises a destination device that correlates each package with packets accessed via the second monitoring device and that calculates the network performance information based on the correlated packages, wherein the monitoring devices monitor a packet flow from the plurality of packet flows; and
- wherein the packages include running duplicate packet count, locally generated sequence number, and locally generated time stamp information for each packet in the package.

25. A system for measuring network performance comprising:
- at least a first and a second processing device for determining network performance information, each processing device being respectively connected to each of the first and second monitoring devices; and
- wherein the first processing device comprises a source device that divides user data packets accessed via the first monitoring device into frames and captures information about the packets in packages corresponding to frames, and the second processing device comprises a destination device that correlates each package with user data packets accessed via the second monitoring device and that calculates the network performance information based on the correlated packets, wherein the monitoring devices monitor a packet flow from the plurality of packet flows, and
- wherein the packages include a packet flow identifier, a frame number, and a package size.

* * * * *

UNITED STATES PATENT AND TRADEMARK OFFICE
CERTIFICATE OF CORRECTION

PATENT NO.     : 6,836,466 B1
DATED          : December 28, 2004
INVENTOR(S)    : Krishna Kant et al.

It is certified that error appears in the above-identified patent and that said Letters Patent is hereby corrected as shown below:

Column 16,
Line 42, change "basket" to -- packet --.

Column 17,
Line 11, after "A method" delete -- of --.

Column 19,
Line 1, after "claim 15," insert -- wherein --.
Line 46, change "tire" to -- the --.

Column 20,
Line 44, after "monitoring" delete -- a --.

Signed and Sealed this

Thirtieth Day of August, 2005

JON W. DUDAS
*Director of the United States Patent and Trademark Office*